United States Patent
Cairns

(10) Patent No.: US 8,224,278 B2
(45) Date of Patent: Jul. 17, 2012

(54) CONVOLUTIONAL IMPAIRMENT COVARIANCE ESTIMATION METHOD AND APPARATUS

(75) Inventor: Douglas A. Cairns, Durham, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 490 days.

(21) Appl. No.: 12/505,139

(22) Filed: Jul. 17, 2009

(65) Prior Publication Data

US 2011/0014874 A1     Jan. 20, 2011

(51) Int. Cl.
*H04B 1/06* (2006.01)
*H04B 7/00* (2006.01)

(52) U.S. Cl. .................................... 455/278.1; 375/346

(58) Field of Classification Search .............. 455/63.1, 455/63.4, 66.1, 67.11, 101, 278.1; 375/346, 375/347, 348, 349, 260, 316
See application file for complete search history.

(56) References Cited

U.S. PATENT DOCUMENTS

2008/0080646 A1*    4/2008   Bottomley et al. ........... 375/341

OTHER PUBLICATIONS

Cairns et al. ("Robust and Efficient Parametric Linear Equalization" 2009 IEEE 69th Vehicular Technology Conference; Apr. 26-29, 2009, Barcelona, Spain, IEEE, Piscataway, NJ, USA, Apr. 26, 2009).*

Cairns et al.: "Robust and Efficient Parametric Linear Equalization" 2009 IEEE 69th Vehicular Technology Conference; Apr. 26-29, 2009, Barcelona, Spain, IEEE, Piscataway, NJ, USA, Apr. 26, 2009.

* cited by examiner

*Primary Examiner* — Ping Hsieh

(57) ABSTRACT

Path delay information generated by a path searcher module of a wireless receiver is used to generate net channel coefficients for use in suppressing interference from a received signal. According to one embodiment, interference is suppressed from a signal transmitted over a communication channel including transmit and receive pulse shaping filters and a radio channel by generating net channel coefficients for the communication channel at processing delays such as G-Rake finger delays or chip equalizer tap delays. Medium channel coefficients are generated for the radio channel at estimated path delays as a function of the net channel coefficients. The net channel coefficients are regenerated at arbitrary delays as a function of the medium channel coefficients and an impairment covariance estimate is generated based at least in part on the regenerated net channel coefficients.

19 Claims, 4 Drawing Sheets

_US 8,224,278 B2_

CONVOLUTIONAL IMPAIRMENT COVARIANCE ESTIMATION METHOD AND APPARATUS

TECHNICAL FIELD

The present invention generally relates to wireless communication systems, and more particularly relates to estimating signal impairments for use in suppressing interference from received signals.

BACKGROUND

The degree to which a wireless receiver can suppress interference affects several variables such as transmission power requirements and link utilization efficiencies in both the uplink and downlink directions of wireless communication systems. Better interference cancellation enables data transmission at lower power levels and/or at higher data rates than would otherwise be possible. The particulars of interference cancellation vary as a function of many variables, such as the communication signal types and protocols involved, details of the transmitting and receiving equipment, etc. However, providing good interference cancellation performance generally requires significant signal processing resources, because of the need to characterize and suppress received signal interference in real time.

For example, the well known generalized Rake (G-Rake) receiver uses a plurality of fingers to suppress interference and improve demodulation. The interference might result from other symbols of interest (self-interference), symbols intended for other users in the same cell (own-cell interference) or symbols intended for other users in other cells (other-cell interference). The fingers capture information about the interference environment and this information is used to suppress the interference. Each finger of the G-Rake receiver includes a correlator placed at a particular processing delay, also referred to interchangeably herein as a finger delay. Impairment cross-correlations between the fingers can be represented as an impairment covariance matrix $R_u$. The impairment covariance matrix can in turn be used to generate combining weights used by the G-Rake receiver to combine de-spread data values. The G-Rake receiver uses the impairment covariance matrix $R_u$ to whiten colored interference in the received signal(s) of interest by computing a combining weight vector, w, as given by:

$$w = R_u^{-1} h \quad (1)$$

where h is the net channel response vector. Each element of h represents the overall propagation channel response between a signal transmitter and a receiver finger, including the radio channel as well as the transmitter and receiver pulse-shaping filters.

The overall impairment covariance matrix $R_u$ used in determining the G-Rake combining weights is typically given by:

$$R_u = E_c R_I + N_0 R_n + \sum_{j=1}^{J} E_c^j R_O^j \quad (2)$$

$$= N_0 R_n + \sum_{j=0}^{J} E_c^j R_O^j - hh^H$$

where $E_c$ is the average energy transmitted per chip of an own-cell base station, $N_0$ is a one-sided power spectral density of white noise, $E_c^j$ is the average energy transmitted per chip of a $j^{th}$ other-cell base station, $R_I$ is an own-cell interference covariance matrix, $R_n$ is a covariance matrix representing white noise passed through a pulse shaping filter and $R_O^j$ is a $j^{th}$ other-cell interference covariance matrix. Net channel coefficients are represented in equation (2) by a vector h which includes the effect of transmit/receive filters in addition to the radio channel.

For parametric G-Rake interference cancellation techniques, the computation of $R_I$ is the major contributor to overall algorithm complexity for receivers that do not model other-cell interference (i.e. $R_O^j$ is modeled as white noise). As such, the complexity of a parametric G-Rake receiver can be reduced by improving the efficiency of the $R_I$ computation, freeing computational resources for other receiver tasks. The second formulation of equation (2) emphasizes that own-cell interference can be computed in a similar fashion to other-cell interference provided that a benign signal term is subtracted (i.e. $R_I = R_O^0 - hh^H$). Thus, even further computational reductions can be realized by improving the efficiency of the $R_I$ computation and the $R_O^j$ computation.

Some conventional techniques for calculating $R_I$ and/or $R_O^j$ involve reformulating the calculations for the elements of $R_I$ from:

$$R_I(d_1, d_2) = \sum_{l=0}^{L-1} \sum_{q=0}^{L-1} g_l g_q^* \sum_{m=-\infty, m \neq 0}^{m=\infty} R_p(d_1 - mT_c - \tau_l) R_p^*(d_2 - mT_c - \tau_q) \quad (3)$$

to $$R_I(d_1, d_2) = \sum_{m=-\infty}^{\infty} h(d_1 - mT_c)(h(d_2 - mT_c))^* - h(d_1)(h(d_2))^* \quad (4)$$

Note that equation (4) requires net channel estimates at chip-spaced intervals. This implies that a grid-like finger placement enables the efficient computation of equation (4) provided the receiver has a sufficient number of fingers.

The grid of fingers available for interference suppression should be of sufficient extent (e.g. density and scope) to yield a reasonable approximation to the infinite summation in equation (4). Absent a sufficient number of fingers, performance degradation occurs. In addition, the grid of fingers used for interference suppression may be precluded from being reused for dual Rake/G-Rake operation. During dual Rake/G-Rake operation, the Rake receiver is used for control channel demodulation and the G-Rake receiver is used for traffic channel demodulation in both uplink and downlink directions. As a specific example, suppose the channel consists of two paths having delays of $T_c$ and $3T_c/4$ where $T_c$ correspond to the chip sampling rate. Under these conditions, a chip spaced or half-chip spaced grid of fingers cannot be constructed for interference cancellation that includes these path delays, requiring additional fingers to enable dual Rake/G-Rake operation. In some cases, additional fingers may not be available. Furthermore, the channel estimates used in computing equation (4) tend to be noisy. As a result, the interference estimates yielded by equation (4) are likewise noisy. This causes performance degradation compared to a receiver with ideal channel estimates. The performance degradation can be significant for a highly dispersive channel.

SUMMARY

According to the methods and apparatus disclosed herein, path delay information generated by a path searcher module of a wireless receiver is used to determine a set of receiver processing delays. The receiver allocates fingers or chip equalizer taps corresponding to the processing delays and estimates the associated net channel coefficients. The net channel coefficients represent the overall propagation channel response between the signal transmitter and receiver, including the radio channel in addition to the transmitter and receiver pulse-shaping filters. Medium channel coefficients are generated based on the net channel coefficients and represent the propagation channel response of the radio channel, but not the transmitter and receiver pulse-shaping filters. The net channel coefficients are then regenerated for arbitrary delays using the medium channel coefficients. The regenerated net channel coefficients are used to compute the elements of an interference matrix for use in suppressing interference.

Because the net channel coefficients are regenerated at arbitrary delays, a substantial grid of fingers or chip equalizer taps can be employed for the purpose of interference computation. These fingers or taps do not need to correspond to the actual physical fingers or taps of the receiver. Thus, the infinite summation in equation (4) does not have to be truncated based on the number of available physical fingers or taps. In addition, dual Rake/G-Rake operation can be realized because reuse of physical fingers is possible. For example, physical fingers can be associated with the path delays estimated by the Rake receiver. Additional fingers can be placed to maximize interference suppression. While these fingers may not fall on a grid, the techniques disclosed herein enable the calculation of the interference matrix for arbitrary finger placement. The techniques disclosed herein also yield less noisy channel estimates, improving performance for a given number of receiver fingers.

According to one embodiment, interference is suppressed from a signal transmitted over a communication channel including transmit and receive pulse shaping filters and a radio channel by generating net channel coefficients for the communication channel at processing delays. Medium channel coefficients are generated for the radio channel at estimated path delays as a function of the net channel coefficients. The net channel coefficients are regenerated at arbitrary delays as a function of the medium channel coefficients and an impairment covariance estimate is generated based at least in part on the regenerated net channel coefficients for use in suppressing interference from the signal.

According to an embodiment of a wireless receiver, the receiver includes a path searcher module operable to estimate the path delays of the radio channel and determine the processing delays. The wireless receiver also includes a coefficient estimation module operable to generate the net channel coefficients for the communication channel at the processing delays and generate the medium channel coefficients for the radio channel at the path delays as a function of the net channel coefficients. The coefficient estimation module is further operable to regenerate the net channel coefficients at arbitrary delays as a function of the medium channel coefficients. An impairment covariance estimation module of the wireless receiver is operable to generate an impairment covariance estimate based at least in part on the regenerated net channel coefficients.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
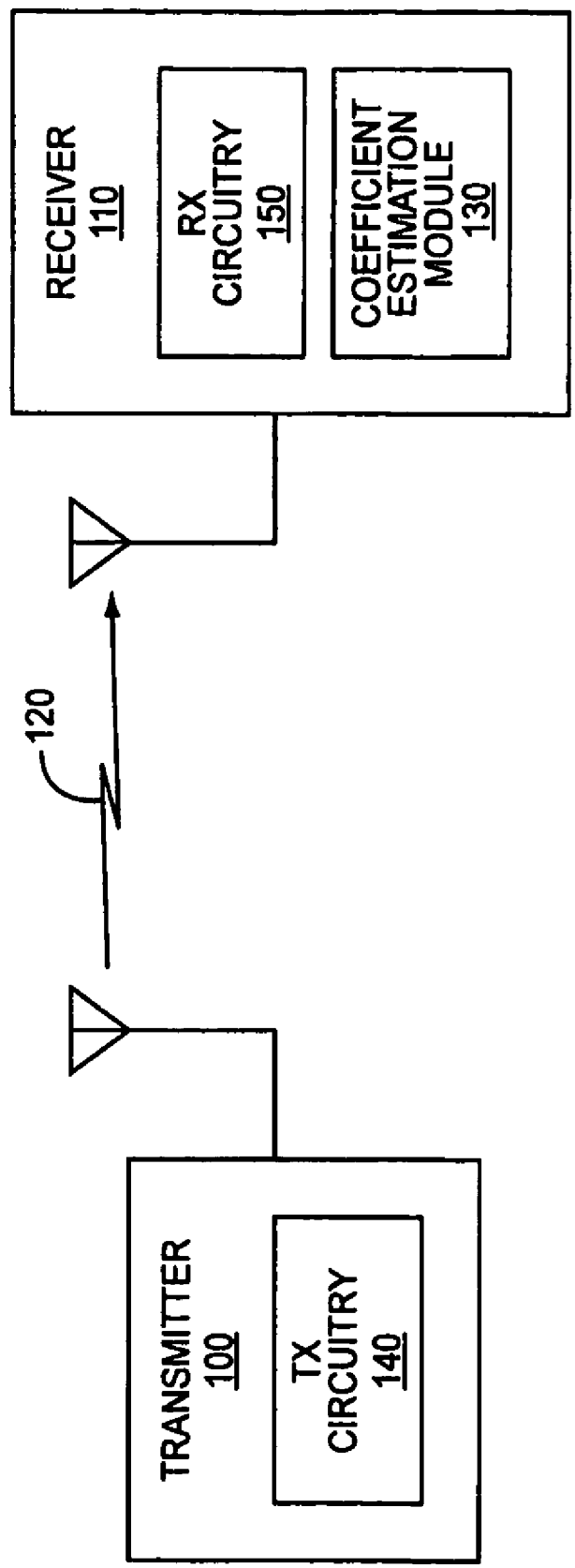
FIG. 1 illustrates a block diagram of an embodiment of a wireless communication system including a transmitter and a receiver.

FIG. 1 illustrates an embodiment of a communication system in which a transmitter 100 communicates with a receiver 110 over a radio channel 120. The receiver 110 can be a G-Rake receiver in some embodiments, a chip equalizer in other embodiments, or any other type of wireless receiver that suppresses interference from a received signal using an estimate of impairment covariance. For downlink transmissions, the transmitter 100 can be a base station such as a Node B and the receiver 110 a mobile wireless device serviced by the base station such as UE (user equipment). Conversely, the transmitter 100 can be a mobile wireless device and the receiver 110 a base station for uplink transmissions. In either case, the receiver 110 includes a coefficient estimation module 130 for determining net channel coefficients for the entire communication channel, including the radio channel 120 as well as transmitter and receiver pulse-shaping filters included in or associated with respective transmit and receive circuitry 140, 150. The coefficient estimation module 130 determines the net channel coefficients by generating initial net channel coefficients for the overall communication channel at processing delays, e.g. path delays plus off-path delays. For G-Rake receiver embodiments, the processing delays referred to herein correspond to finger delays. For chip equalizer embodiments, the processing delays correspond to chip equalizer tap delays. In each case, the coefficient estimation module 130 generates medium channel coefficients for the radio channel 120 at estimated path delays as a function of the net channel coefficients and regenerates the net channel coefficients at arbitrary delays as a function of the medium channel coefficients. The receiver 110 generates an impairment covariance estimate, e.g. in accordance with equation (4) based at least in part on the regenerated net channel coefficients for use in suppressing interference from a signal received over the radio channel 120.

Figure 2:
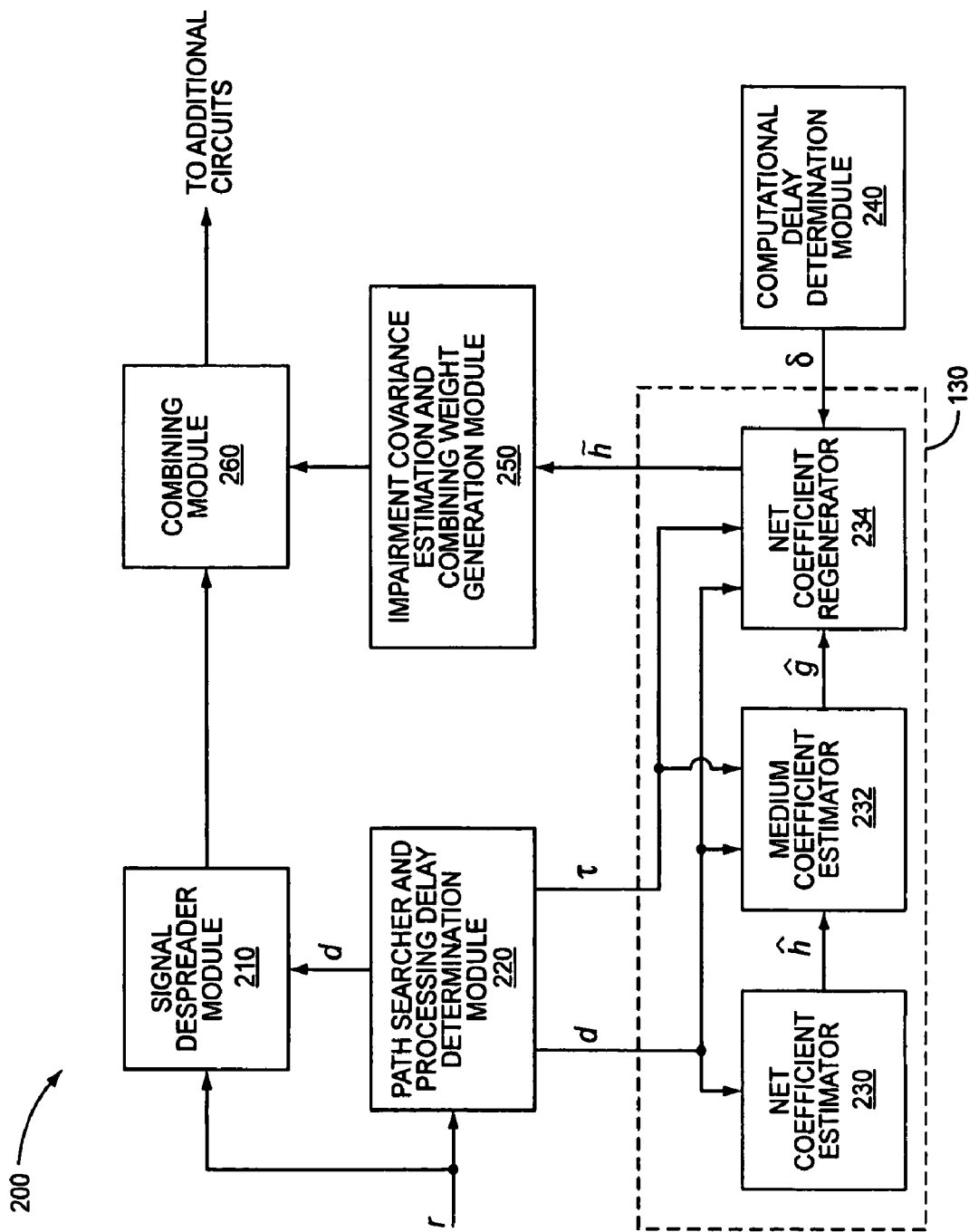
FIG. 2 illustrates a block diagram of an embodiment of signal processing modules included in a G-Rake receiver.

FIG. 2 illustrates an embodiment where the receiver 110 is implemented as a G-Rake receiver 200. The G-Rake receiver 200 includes a signal despreader module 210 having some fingers placed at certain processing (finger) delays, e.g. path delays for extracting signal energy from delayed signal images. The signal despreader module 210 has additional fingers placed at other processing delays, e.g. off-path delays for improving the interference-suppressing capability of the receiver. The processing (finger) delays d provided to the signal despreader module 110 for use in finger placement are generated by a path searcher and processing delay determination module 220 of the G-Rake receiver 200. The G-Rake receiver 200 treats the path searcher output as being accurate so that the noise associated with the net channel estimates can be reduced by generating medium channel coefficients from measurements of the net channel coefficients, and then regenerating the net coefficients using pulse shape information as described in more detail later herein.

Figure 3:
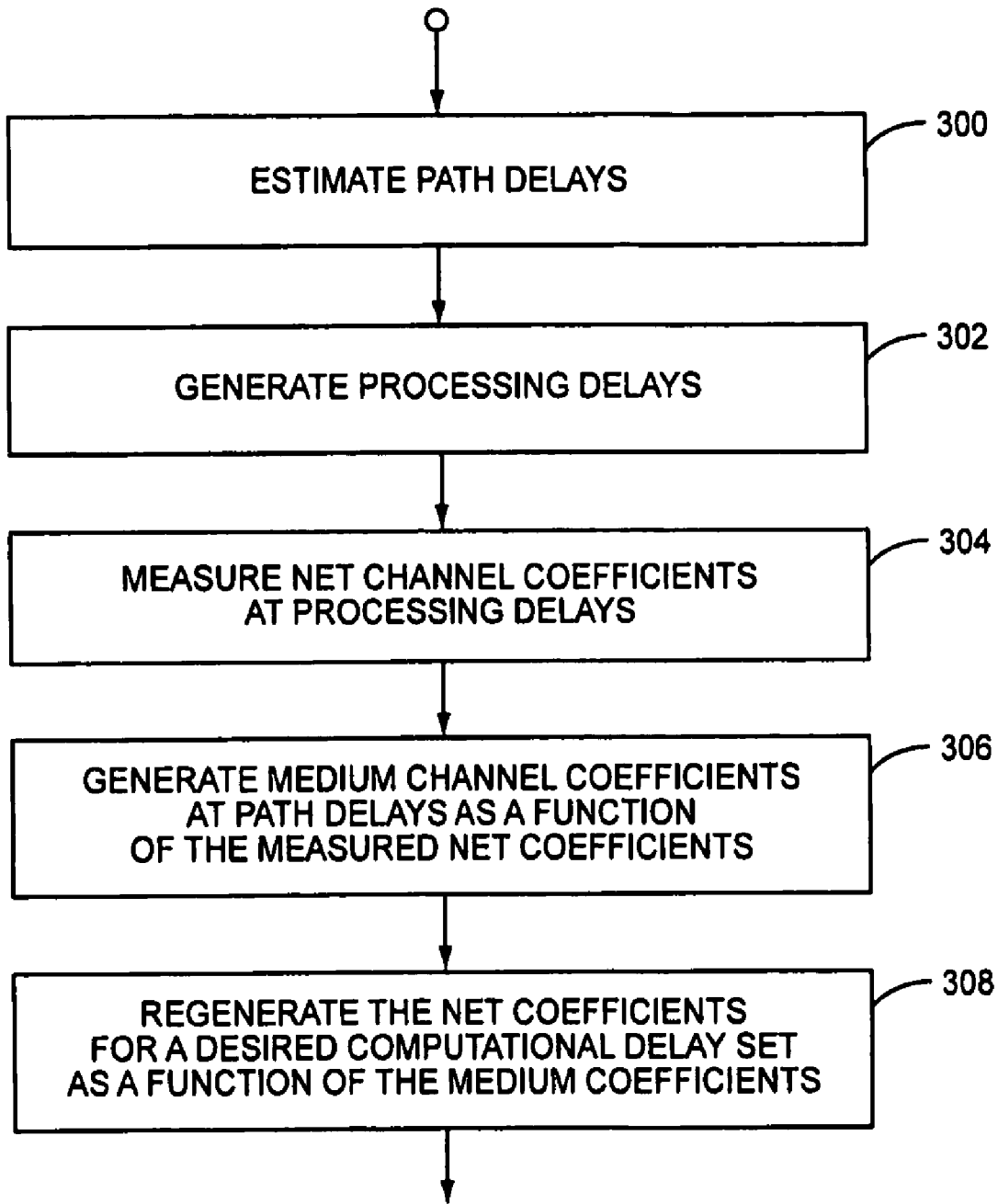
FIG. 3 illustrates a flow diagram of an embodiment of processing logic for estimating net channel coefficients at arbitrary delays as a function of medium channel coefficients.

FIG. 3 illustrates an embodiment of processing logic implemented by the G-Rake receiver 200 for estimating net channel coefficients. The processing logic can be implemented by other receiver types, such as, but not limited to, chip equalizers where the processing delays referred to are chip equalizer tap delays instead of G-Rake finger delays. The processing logic begins by the path searcher and processing delay determination module 220 estimating a set of path delays $S_p \epsilon [\tau_0, \tau_1, \ldots, \tau_{L-1}]$ for the radio channel 120 using well known means, where $\tau_i$ corresponds to the ith path delay of the radio channel 120 (Step 300). The path searcher and processing delay determination module 220 also generates a processing (finger) delay set $S_f \epsilon [d_0, d_1, \ldots, d_{N-1}]$, where $d_j$ corresponds to the jth processing (finger) delay (Step 302). The processing (finger) delay set can be determined from the path delay set $S_p$ using any well known means, e.g. as disclosed in U.S. Pat. No. 6,922,434 and U.S. patent application Ser. No. 12/408,939 filed on Mar. 23, 2009, the contents of which are incorporated herein by reference in their entirety. In one embodiment, the number of estimated path delays $\tau$ is less than the number of processing (finger) delays d. The signal despreader module 210 makes finger assignments based on the processing delay information output by the path searcher and processing delay determination module 220 and uses the fingers to despread the received signal.

The processing logic continues with the coefficient estimation module 130 determining the net channel coefficients. In more detail, a net coefficient estimator 230 included in or associated with the coefficient estimation module 130 generates net channel coefficients corresponding to the processing (finger) delay set $S_f$ (Step 304) as given by:

$$\hat{h} = \frac{1}{N_p} \sum_{k=0}^{N_p-1} x_{pilot}(k)(s(k))^* \quad (5)$$

where $x_{pilot}(k)$ is a vector of despread pilot symbols and s(k) is the known pilot symbol transmitted during the $k^{th}$ symbol interval. The net channel coefficients can be measured at the processing (finger) delays using any known approach, e.g. as disclosed in U.S. patent application Ser. No. 12/133,636 filed on Jun. 5, 2008, the content of which is incorporated herein by reference in its entirety. A medium coefficient estimator 232 included in or associated with the coefficient estimation module 130 generates medium channel coefficients corresponding to the path delay set $S_p$ as a function of the net channel coefficients ĥ (Step 306) as given by:

$$\hat{g} = (B^H B)^{-1} B^H \hat{h} \quad (6)$$

In equation (6), $\hat{h} = [\hat{h}(d_0), \hat{h}(d_1), \ldots, \hat{h}(d_{N-1})]^T$ is a vector of the net channel coefficients from equation (5), $\hat{g} = [\hat{g}(\tau_0), \hat{g}(\tau_1), \ldots, \hat{g}(\tau_{L-1})]^T$ is a vector of the estimated medium channel coefficients and B is a conversion matrix. The (i, j) element of the conversion matrix B is given by $R_{Tx/Rx}(d_i - \tau_j)$, where $R_{Tx/Rx}(\Delta)$ is the convolution of the transmit and receive pulse shape filters evaluated at $\Delta$.

A net coefficient regenerator 234 included in or associated with the coefficient estimation module 130 regenerates the net channel coefficients for an arbitrary computational delay set as a function of the medium channel coefficients ĝ (Step 308) as given by:

$$\tilde{h} = \tilde{B} \hat{g} \quad (7)$$

In equation (7), $\tilde{B}$ is a conversion matrix, with the (i, j) element given by $R_{Tx/Rx}(\delta_i - \tau_j)$ and $\tilde{h} = [\tilde{h}(\delta_0), \tilde{h}(\delta_1), \ldots, \tilde{h}(\delta_{M-1})]^T$ is a vector of the regenerated net channel coefficients corresponding to a computational set of arbitrary delays $S_c \epsilon [\delta_0, \delta_1, \ldots, \delta_{M-1}]$, where $\delta_k$ is the kth arbitrary delay. The conversion matrix $\tilde{B}$ is designed to superimpose the responses of the transmit and receive pulse shaping filters on the medium channel coefficients ĝ to regenerate the net channel coefficients ĥ.

Figure 4:
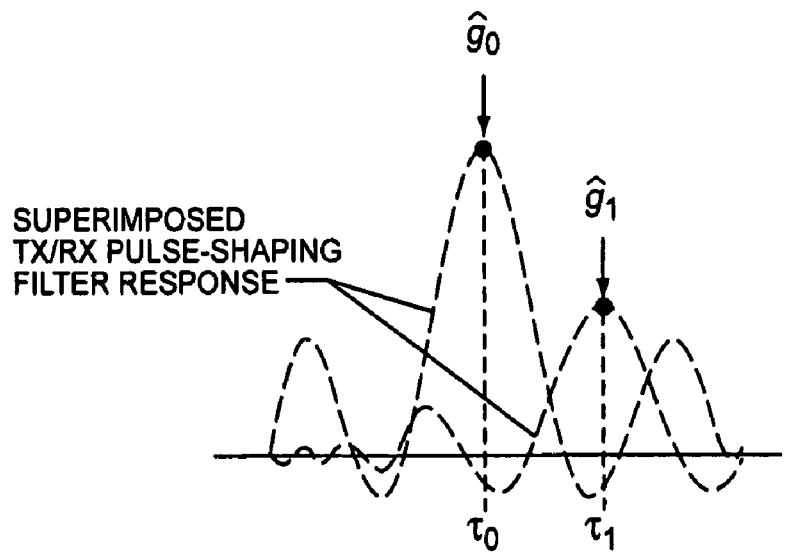
FIG. 4 illustrates the effect of superimposing transmit and receive pulse shaping filter responses on medium channel coefficients determined at particular path delays.
Figure 5:
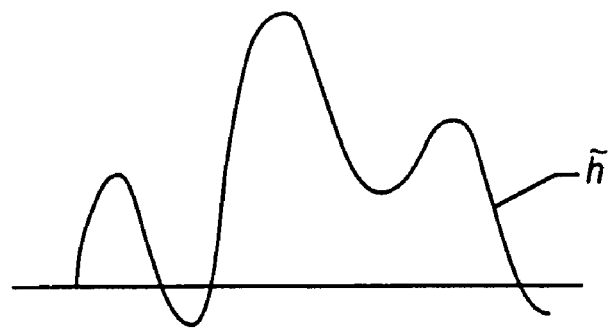
FIG. 5 illustrates a composite net channel response waveform generated by combining the individual net channel waveforms of FIG. 4.
Figure 6:
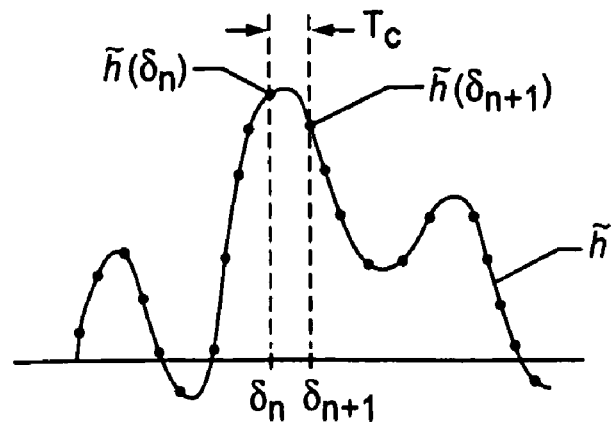
FIG. 6 illustrates a waveform diagram showing regenerated net channel coefficients obtained at arbitrary delays from the composite net channel waveform of FIG. 5.

The effect of the conversion matrix $\tilde{B}$ in equation (7) can be visualized in three parts as illustrated in FIGS. 4-6. The first part involves the filter response associated with both the transmit and receive pulse shaping filters being superimposed on each medium channel coefficient at the corresponding estimated path delay τ. Doing so yields a composite response centered at each of the estimated path delays τ as illustrated in FIG. 4. FIG. 4 shows the composite transmit and receive pulse shaping filter response associated with an exemplary (real) 2-tap channel superimposed on both a first medium channel coefficient $\hat{g}_0$ corresponding to a first path delay $\tau_0$ and a second medium channel coefficient $\hat{g}_1$ corresponding to a second path delay $\tau_1$. The result is two composite responses each being centered about one of the two path delays. The different composite responses are then combined with one another to yield an overall net channel response waveform for the entire communication channel as illustrated in FIG. 5. The net channel coefficients ĥ can then be regenerated based on the values of the composite net channel response waveform at the arbitrary delays δ. That is, the net channel coefficients $\tilde{h}(\delta_0), \tilde{h}(\delta_1), \ldots, \tilde{h}(\delta_{M-1})$ can be regenerated by identifying the value of the net channel response waveform at each of the arbitrary delays $\delta_0, \delta_1, \ldots, \delta_{M-1}$ as illustrated in FIG. 6.

A computational delay determination module 240 of the G-Rake receiver 200 determines the set $S_c$ of arbitrary delays used for regenerating the net channel coefficients. In one embodiment, the computational delay set may be equivalent to the processing (finger) delay set (i.e., $S_c = S_f$). In another embodiment, the computational delay set $S_c$ is richer/denser than the processing (finger) delay set $S_f$. For example, the computational delay set $S_c$ can be a superset of the processing (finger) delay set $S_f$. In addition, the arbitrary delays can be spaced based on a chip sampling rate ($1/T_c$) or sub-chip sampling rate of the signal transmitted over the radio channel 120 as shown in FIG. 6, where $T_c$ is the chip spacing interval. In yet another embodiment, the computational delay determination module 240 generates a grid of arbitrary delays centered on one of the processing (finger) delays, e.g. the strongest path, the first arriving path, etc.

In each case, the net channel coefficients ĥ are regenerated at the arbitrary delays as a function of the medium channel coefficients ĝ. An impairment covariance estimation and combining weight generation module 250 of the G-Rake receiver 200 generates an impairment covariance estimate $R_1$ based on the regenerated net channel coefficients ĥ for use in suppressing interference from the received signal, e.g. as given by equation (4) with h replaced by ĥ. A combining module 260 of the G-Rake receiver 200 combines despread values output by the despreader module 210 according to combining weights generated by the impairment covariance estimation and combining weight generation module 250. The combining weights are generated in consideration of the received signal impairments using well known means so that the combining weights suppress same-cell and other-cell interference in the resulting combined signal, e.g. in accordance with equation (1).

While one or more of the above embodiments present G-Rake receiver details, the methods and apparatus taught herein for suppressing interference from a received signal may be advantageously applied to other receiver types. By way of non-limiting example, receiver 110 is, in one or more embodiments, configured as a chip equalizer. In such chip equalizer embodiments, the processing delays referred to herein are chip equalizer tap delays and interference may be suppressed according to the above teachings. The various receivers 110 disclosed herein, whether comprising G-Rake receivers or chip equalizers, thus include processing circuits configured to carry out one or more of the methods disclosed herein, which generally comprise generating net channel coefficients for a communication channel at processing delays, generating medium channel coefficients for a corresponding radio channel at estimated path delays as a function of the net channel coefficients, regenerating the net channel coefficients at arbitrary delays as a function of the medium channel coefficients and generating an impairment covariance estimate based at least in part on the regenerated net channel coefficients for use in suppressing interference from the signal.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of suppressing interference from a signal transmitted over a communication channel including transmit and receive pulse shaping filters and a radio channel, the method comprising:
    generating net channel coefficients for the communication channel at processing delays;
    generating medium channel coefficients for the radio channel at estimated path delays as a function of the net channel coefficients;
    regenerating the net channel coefficients at arbitrary delays as a function of the medium channel coefficients;
    generating an impairment covariance estimate based at least in part on the regenerated net channel coefficients for use in suppressing interference from the signal;
    superimposing a filter response associated with both the transmit and receive pulse shaping filters on each of the medium channel coefficients at the corresponding estimated path delay to yield a composite response centered at each of the estimated path delays;
    combining the different composite responses to yield an overall net channel response waveform for the entire communication channel; and
    regenerating the net channel coefficients based on values of the overall net channel response waveform at the arbitrary delays.

2. The method of claim 1, wherein the number of estimated path delays is less than or equal to the number of processing delays.

3. The method of claim 1, comprising converting the medium channel coefficients to the regenerated net channel coefficients based on a conversion matrix designed to combine the effects of one or more medium channel coefficients with the transmit and receive pulse shaping filters.

4. The method of claim 3, comprising multiplying the conversion matrix with a vector of the medium channel coefficients to compute a vector of the regenerated net channel coefficients, wherein element (i, j) of the conversion matrix corresponds to a convolution of the transmit and receive pulse shaping filter responses evaluated at the ith arbitrary delay and the jth estimated path delay.

5. The method of claim 1, wherein the arbitrary delays are spaced based on a chip sampling rate of the signal transmitted over the communication channel.

6. The method of claim 1, wherein the arbitrary delays are spaced more densely than the processing delays.

7. The method of claim 1, wherein the arbitrary delays are a superset of the processing delays.

8. The method of claim 1, wherein the arbitrary delays comprise a grid of delays centered on one of the processing delays.

9. The method of claim 1, comprising computing:

$$R_I(d_1, d_2) = \sum_{m=-\infty}^{\infty} \tilde{h}(d_1 - mT_c)(\tilde{h}(d_2 - mT_c))^* - \tilde{h}(d_1)(h(d_2))^*,$$

wherein $R_I(d_1, d_2)$ is an interference matrix component of the impairment covariance estimate, $\tilde{h}$ is a vector of the regenerated net channel coefficients, $d_1$ and $d_2$ are processing delays and $T_c$ is a chip duration of the signal transmitted over the communication channel.

10. A wireless receiver for receiving a signal transmitted over a communication channel including transmit and receive pulse shaping filters and a radio channel, the wireless receiver comprising:
    a path searcher module operable to estimate path delays of the radio channel and determine processing delays;
    a coefficient estimation module operable to generate net channel coefficients for the communication channel at the processing delays, generate medium channel coefficients for the radio channel at the path delays as a function of the net channel coefficients and regenerate the net channel coefficients at arbitrary delays as a function of the medium channel coefficients; and
    an impairment covariance estimation module operable to generate an impairment covariance estimate based at least in part on the regenerated net channel coefficients, wherein
        the coefficient estimation module is operable to superimpose a filter response associated with both the transmit and receive pulse shaping filters on each of the medium channel coefficients at the corresponding path delay to yield a composite response centered at each of the path delays, combine the different composite responses to yield an overall net channel response waveform for the entire communication channel and regenerate the net channel coefficients based on values of the overall net channel response waveform at the arbitrary delays.

11. The wireless receiver of claim 10, wherein the number of path delays is less than or equal to the number of processing delays.

12. The wireless receiver of claim 10, wherein the coefficient estimation module is operable to convert the medium channel coefficients to the regenerated net channel coefficients based on a conversion matrix designed to combine the effects of one or more medium channel coefficients with the transmit and receive pulse shaping filters.

13. The wireless receiver of claim 12, wherein the coefficient estimation module is operable to multiply the conversion matrix with a vector of the medium channel coefficients to compute a vector of the regenerated net channel coefficients, wherein element (i, j) of the conversion matrix corresponds to a convolution of the transmit and receive pulse shaping filter responses evaluated at the ith arbitrary delay and the jth path delay.

14. The wireless receiver of claim 10, wherein the arbitrary delays are spaced based on a chip sampling rate of the signal transmitted over the communication channel.

15. The wireless receiver of claim 10, wherein the arbitrary delays are spaced more densely than the processing delays.

16. The wireless receiver of claim 10, wherein the arbitrary delays are a superset of the processing delays.

17. The wireless receiver of claim 10, wherein the arbitrary delays comprise a grid of delays centered on one of the processing delays.

18. The wireless receiver of claim 10, comprising an impairment covariance estimation module operable to compute $$R_I(d_1, d_2) = \sum_{m=-\infty}^{\infty} \tilde{h}(d_1 - mTc)(\tilde{h}(d_2 - mTc))^* - \tilde{h}(d_1)(h(d_2))^*,$$

wherein $R_I(d_1, d_2)$ is an interference matrix component of the impairment covariance estimate, $\tilde{h}$ is a vector of the regenerated net channel coefficients, $d_1$ and $d_2$ are processing delays and $T_c$ is a chip duration of the signal transmitted over the communication channel.

19. The wireless receiver of claim 10, wherein the wireless receiver is a G-Rake receiver.

* * * * *

UNITED STATES PATENT AND TRADEMARK OFFICE
CERTIFICATE OF CORRECTION

PATENT NO. : 8,224,278 B2  
APPLICATION NO. : 12/505139  
DATED : July 17, 2012  
INVENTOR(S) : Cairns Page 1 of 1

It is certified that error appears in the above-identified patent and that said Letters Patent is hereby corrected as shown below:

In Column 2, Line 1, delete "$R_1$" and insert -- $R_I$ --, therefor.

In Column 2, Line 9, delete "$R_1$" and insert -- $R_I$ --, therefor.

In Column 2, Line 13, delete "$R_1$" and insert -- $R_I$ --, therefor.

In Column 2, Line 18, delete "$R_1$" and insert -- $R_I$ --, therefor.

In Column 2, Line 19, delete "$R_1$" and insert -- $R_I$ --, therefor.

In Column 2, Line 21, delete "$R_1$" and insert -- $R_I$ --, therefor.

In Column 2, Line 23, delete "$R_1$" and insert -- $R_I$ --, therefor.

In Column 6, Line 53, delete "$R_1$" and insert -- $R_I$ --, therefor.

Signed and Sealed this  
Second Day of October, 2012

David J. Kappos  
*Director of the United States Patent and Trademark Office*